(12) United States Patent
Katagiri

(10) Patent No.: US 7,578,406 B2
(45) Date of Patent: Aug. 25, 2009

(54) COVER

(75) Inventor: Katsuhiro Katagiri, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 703 days.

(21) Appl. No.: 11/218,522

(22) Filed: Sep. 6, 2005

(65) Prior Publication Data
US 2006/0054630 A1 Mar. 16, 2006

(30) Foreign Application Priority Data
Sep. 14, 2004 (JP) ............... 2004-267336

(51) Int. Cl.
*B65D 17/50* (2006.01)
(52) U.S. Cl. ............ 220/260; 220/812; 220/830; 220/832; 220/835; 224/282; 224/483; 224/539
(58) Field of Classification Search ............ 220/254.5, 220/260, 264, 830, 835, 811, 812, 813; 224/483, 224/282, 539
See application file for complete search history.

(56) References Cited
U.S. PATENT DOCUMENTS
2003/0071047 A1 * 4/2003 Harada ............... 220/835

FOREIGN PATENT DOCUMENTS

| JP | A-02-204143 | 8/1990 |
|---|---|---|
| JP | A-02-267038 | 10/1990 |
| JP | U-5-76894 | 10/1993 |
| JP | A-06-247203 | 9/1994 |
| JP | A-08-244536 | 9/1996 |
| JP | A-2002-193293 | 7/2008 |

OTHER PUBLICATIONS

Office Action dated Nov. 25, 2008 in corresponding Japanese patent application No. 2004-267336.

* cited by examiner

Primary Examiner—Anthony D Stashick
Assistant Examiner—Elizabeth Volz
(74) Attorney, Agent, or Firm—Posz Law Group, PLC

(57) ABSTRACT

A cover includes a cover body, a guide, and an urging member. The cover body opens and closes an opening, formed in an accommodation housing. The guide is disposed in the accommodation housing, and extends in a direction crossing a direction, in which the cover body opens and closes the opening, partially at least. The urging member has a fastened end, fastened to the cover body, and an engagement end, engaged with the guide, and is expandable and contractable for accumulating an urging force as the cover body opens and closes the opening. The urging force urges the cover body in at least one of occasions, when the cover body opens the opening and when the cover body closes the opening.

12 Claims, 6 Drawing Sheets

COVER

BACKGROUND OF THE INVENTION

1. Field of the Invention

The present invention relates to a cover for opening and closing an opening, which is formed in an accommodation housing.

2. Description of the Related Art

Various covers for opening and closing an opening of accommodation housings have been known. However, depending on the types of accommodation housings, a user might feel burdened when opening and closing covers. For example, in an accommodation housing, such as a glove box, which is disposed in a vehicle, a user might feel difficulty when opening and closing the accommodation housing, because it might be necessary for the user to open and close the accommodation housing in a limited space. Therefore, as disclosed in Japanese Unexamined Patent Publication (KOKAI) No. 2-267,038, a cover has been developed, cover which enables a user to open and close a cover body with ease. In the cover disclosed in the publication, a motor is started by first applying an opening operation force or a closing operation force to the cover body manually, and the cover body is thereafter actuated to open or close by the motor. In such a cover, a user can open or close the cover body with an easy operation. Accordingly, it is possible to open or close the cover body without giving burdens to the user. In the meanwhile, however, there arises a problem that the manufacturing cost of such a cover has gone up, because motors are expensive.

On the other hand, there have been covers comprising cover bodies equipped with an urging member, such as a spring, for urging the cover bodies when opening and closing the cover bodies. The urging member is disposed to expand or contract in the opening or closing direction of the cover bodies, and is expanded or contracted to accumulate an urging force when opening or closing the cover bodies. Thus, the cover bodies are opened or closed by the accumulated urging force. However, in such conventional covers, there have been problems associated with the degrees of freedom in designing covers and accommodation housings, such as in designing the shape of cover bodies, the shape of accommodation housings, and the opening or closing direction of cover bodies, because the expanding direction or contracting direction of the urging member has limited the opening or closing direction of the cover body.

SUMMARY OF THE INVENTION

The present invention has been developed in view of the aforementioned circumstances. It is therefore an object of the present invention to provide a cover which can be manufactured inexpensively, and which hardly limits the degree of designing freedom.

A cover according to the present invention can achieve the aforementioned object, and comprises:

a cover body for opening and closing an opening, the opening formed in an accommodation housing;

a guide disposed in the accommodation housing, and extending in a direction crossing a direction, in which the cover body opens and closes the opening, partially at least; and an urging member having opposite ends, one of the opposite ends making a fastened end fastened to the cover body so as to hold the urging member to the cover body, the other one of the opposite ends making an engagement end engaged with the guide so as to be guided by the guide, the urging member being expandable and contractable for accumulating an urging force as the cover body opens and closes the opening, the urging force urging the cover body in at least one of occasions, when the cover body opens the opening and when the cover body closes the opening.

In the present cover, the guide can preferably comprise a close end, onto which the engagement end of the urging member is placed when the cover body moves to a close position at which the cover body closes the opening, an open end, onto which the engagement end of the urging member is placed when the cover body moves to an open position at which the cover body opens the opening, and a connector connecting the close end and the open end; and one of the close end and the open end can preferably have a longer minimum distance to a locus, on which the fastened end of the urging member moves, than that of the other one of the close end and the open end.

The present cover provided with the above-described preferable arrangements can preferably be furthermore arranged in one of manners set forth in (1) and (2) below.

(1) The urging member accumulates the urging force when being contracted;

the connector of the guide comprises a first connector, and a second connector, the first connector connecting the close end and the open end, and guiding the engagement end of the urging member when the cover body moves from the close position to the open position, the second connector connecting the close end and the open end, and guiding the engagement end of the urging member when the cover body moves from the open position to the close position; and one of the first connector and the second connector has an inflection point from which the minimum distance to the locus, on which the fastened end of the urging member moves, is the shortest of all the other minimum distances from the other portions of the guide to the locus.

(2) The urging member accumulates the urging force when being expanded;

the connector of the guide comprises a first connector, and a second connector, the first connector connecting the close end and the open end, and guiding the engagement end of the urging member when the cover body moves from the close position to the open position, the second connector connecting the close end and the open end, and guiding the engagement end of the urging member when the cover body moves from the open position to the close position; and one of the first connector and the second connector has an inflection point from which the minimum distance to the locus, on which the fastened end of the urging member moves, is the longest of all the other minimum distances from the other portions of the guide to the locus.

Moreover, in the present cover, the cover body can preferably have a top end, a bottom end, and a pivotable supporter disposed at the bottom end and pivotably supported to the accommodation housing, and swings downward about the pivotable supporter from the open position to the close position, or vice versa, by its own weight; and the urging member can preferably accumulate the urging force in magnitude, which hardly halts the cover body swinging downward but can urge the cover body to open or close the opening of the accommodation housing.

In the present cover, the cover body moves from the open position to the close position, or vice verse, and thereby the urging member accumulates the urging force. The accumulated urging force urges the cover body in at least one of occasions, when the cover body opens the opening of the accommodation housing and when the cover body closes the opening. Thus, the urging force, which has been accumulated in advance, urges the cover body when the cover body opens the opening and/or when the cover body closes the opening. Accordingly, it is possible to make the opening operation and/or closing operation of the cover body easy, without disposing motors. Consequently, it is possible to manufacture the present cover inexpensively.

Specifically, the urging member is held to the cover body, and the engagement end, one of the opposite ends, is engaged with the guide. Accordingly, the urging member moves along with the opening and closing operations of the cover body, and simultaneously the guide guides the engagement end of the urging member to move on the guide. Note that the guide extends in a direction crossing a direction, in which the cover body opens and closes the opening of the accommodation housing, partially at least. Consequently, the distance between the fastened end of the urging member, which is fastened to the cover body, and the engagement end of the urging member varies depending on the operational positions of the cover body and the shape of the guide. The urging member expands or contracts to accumulate the urging force depending on the varying distance. However, the urging member, in which the urging force is accumulated, tries to recover the original shape again. Accordingly, the urging member, which has been contracted to accumulate the urging force, tries to re-deform in an expansion direction, and the urging member, which has been expanded to accumulate the urging force, tries to re-deform in a contraction direction. As described above, the urging member expands or contracts depending on the varying distance between the fastened end and the engagement end. Consequently, the engagement end of the urging member moves on the guide in a direction increasing (or decreasing) the distance between itself and the fastened end, or the fastened end of the urging member moves in a direction increasing (or decreasing) the distance between itself and the engagement end. Thus, the urging member urges the cover body to open and/or close the opening of the accommodation housing, because the fastened end of the urging member is fastened to the cover body, and moves along with the cover body while moving close to and/or away from the engagement end, which is guided by the guide, relatively.

Moreover, in the present cover, not only the urging member is held to the cover body, but also it moves along with the opening and closing operations of the cover body and expands or contracts while being guided by the guide which extends in a direction crossing a direction, in which the cover body opens and close the opening of the accommodation housing, partially at least. Accordingly, the expanding and contracting directions of the urging member also coincide with the direction crossing the opening and closing directions of the cover body. Therefore, the opening and closing directions of the cover body are determined depending on the extending direction of the guide. In other words, it is possible to set the opening and closing directions of the cover body in desired directions by setting the extending direction of the guide, that is, the shape of the guide. Consequently, the present cover enhances the degree of designing freedom, because it is possible to apply the present cover to accommodation housings with various shapes.

In addition, the shape of the guide determines the magnitude of the urging force accumulated in the urging member, that is, the strength for urging the cover body to open and close the opening of the accommodation housing, and further the timing for accumulating the urging force as well as the timing for releasing the urging force. Thus, the present cover furthermore enhances the degree of designing freedom, because it is possible to set the strength for urging the cover body to open and/or close and the timings as desired.

Note the present cover also produces an advantage that the cover body opens and closes the opening of the accommodation housing smoothly, because not only the urging member connects the cover body and the guide but also the urging member itself moves along with the cover body.

In the present cover, the guide can preferably comprise the close end, the open end, and the connector; and one of the close end and the open end can preferably have a longer minimum distance to a locus, on which the fastened end of the urging member (hereinafter, simply referred to as a "minimum distance") moves, than that of the other one of the close end and the open end. The preferable arrangement makes it possible to simplify the construction of the present cover.

If such is the case, and when the close end of the guide has a longer minimum distance than that of the open end, for example, the engagement end of the urging member moves from the close end of the guide toward the open end, and thereby the urging member is contracted (or expanded) to accumulate the urging force. Then, the urging member, which has been contracted (or expanded) to accumulate the urging force, is expanded (or contracted) when the engagement end of the urging member moves back from the open end of the guide to the close end. Accordingly, the urging member urges the cover body to close. On the contrary, when the open end of the guide has a longer minimum distance than that of the close end, for instance, the urging member accumulates the urging force as the cover body closes. Consequently, the urging member urges the cover body to open.

Moreover, in the above-described preferable arrangement, the urging member can preferably accumulate the urging force when being compressed; the connector of the guide can preferably comprise the first connector, and the second connector; and one of the first connector and the second connector can preferably have an inflection point from which the minimum distance is the shortest of all the other minimum distances from the other portions of the guide. This furthermore preferable arrangement can produce the urging force of much larger magnitude. Accordingly, it is possible to fully urge the cover body to move from the close position to the open position, or vice versa, even when the cover body has a heavy weight. Specifically, the urging member is contracted to accumulate the urging force of predetermined magnitude when the cover body opens (or closes). The cover body keeps closing (or opening) until the engagement end of the urging member reaches the inflection point of one of the first connector and the second connector. Consequently, the cover body further contracts the urging member, and thereby the urging member further accumulates the urging force. After the engagement end goes beyond the inflection point, the urging member urges the cover body to close (or open) with the thus accumulated urging force. In this instance, the accumulated urging force is a sum of the urging force, which the urging member accumulates when the cover body opens (or closes), and the urging force, which the urging force accumulates when the cover body keeps closing (or opening) until the engagement end reaches the inflection point. As a result, it is possible to produce the urging force of much larger magnitude.

Note that the furthermore preferable arrangement makes it possible to set the magnitude of the accumulated urging force and the timing for urging the cover body to close (or open) by setting the position of the inflection point properly. Therefore, the furthermore preferable arrangement furthermore enhances the degree of freedom in designing the present cover.

In addition, even when the urging member accumulates the urging force when being expanded; the connector of the guide comprises the first connector, and the second connector; and one of the first connector and the second connector has an inflection point from which the minimum distance is the longest of all the other minimum distances from the other portions of the guide, it is possible to produce the urging force of much larger magnitude in a manner similar to the above-described manner.

In the present cover, the cover body can preferably have a top end, a bottom end, and a pivotable supporter disposed at the bottom end and pivotably supported to the accommodation housing, and can preferably swing downward about the pivotable supporter from the open position to the close position, or vice versa, by its own weight; and the urging member can preferably accumulate the urging force in magnitude, which hardly halts the cover body swinging downward but can urge the cover body to open or close the opening of the accommodation housing. If such is the case, the cover body can perform the opening operation (or closing operation) by its own weight automatically, and thereby the urging member can accumulate the urging force therein, and the urging member can urge the cover body to close (or open) by means of the then accumulated urging force. Therefore, the preferable arrangement enables the cover body to move from the open position to the close position, or vice versa, much more smoothly.

The present cover can be preferably used as a device for opening and closing an opening of accommodation housings, disposed in limited spaces. Such accommodation housings can be represented by glove boxes disposed in vehicles, for example. However, not limited to these, the present cover can be used as a device for opening and closing an opening of a variety of furniture articles and home electric appliances when regarding them as the accommodation housing. For instance, when considering a cabinet or cupboard the accommodation housing, the door or drawers can be regarded as the cover body. Moreover, when considering a foldaway table the accommodation housing, the foldaway table itself can be regarded as the cover body.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
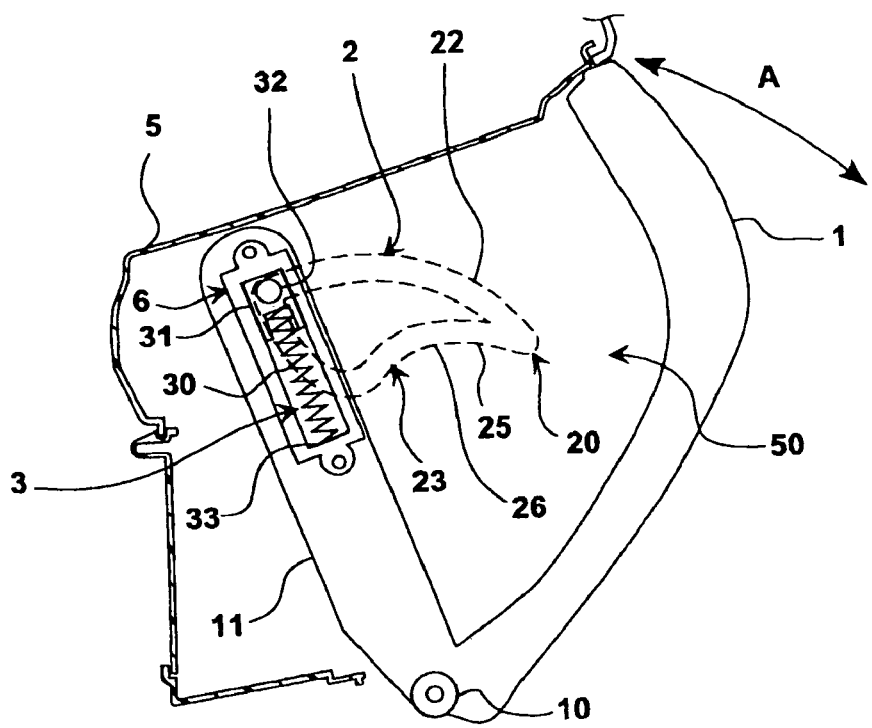
FIG. 1 is a diagram for schematically illustrating a cover according to Example No. 1 of the present invention.

Having generally described the present invention, a further understanding can be obtained by reference to the specific preferred embodiments which are provided herein for the purpose of illustration only and not intended to limit the scope of the appended claims.

EXAMPLES

Hereinafter, the present invention will be described in detail with reference to the accompanying drawings showing covers according to examples of the present invention.

Example No. 1

A cover according to Example No. 1 of the present invention constitutes a part of a glove box which is disposed in a vehicle passenger room. The cover opens and closes an opening which is formed in an accommodation housing. That is, a box-shaped glove-box body, one of whose peripheral walls is provided with an opening, constitutes the accommodation housing. FIGS. 1 through 4 illustrate the cover according to Example No. 1.

The cover according to Example No. 1 of the present invention comprises a cover body 1, a guide 2, and an urging member 3.

The cover body 1 has a pivotable supporter 10 disposed at the lower end. The pivotable supporter 10 is held pivotably to the lower end of a glove-box body 5, which is provided with an opening 50. Thus, the cover body 1 swings about the pivotably supporter 10 to open and close the opening 50. Note that the directions designated at the arrow "A" of FIG. 1 specify the opening/closing direction of the cover body 1.

Figure 2:
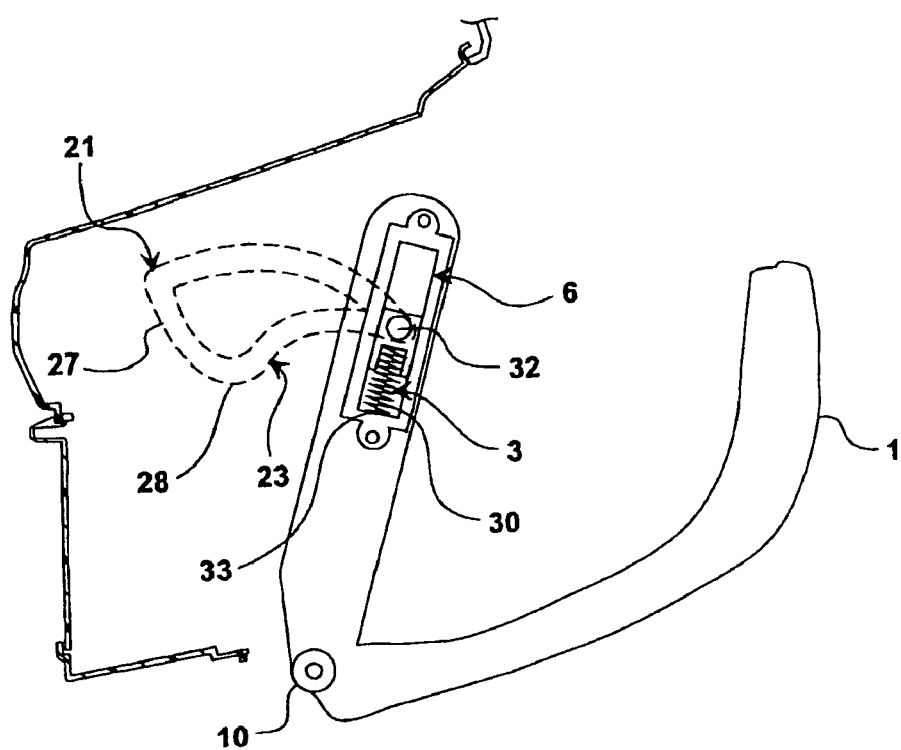
FIG. 2 is another diagram for schematically illustrating the cover according to Example No. 1 of the present invention.

The guide 2 is formed in a groove shape. Specifically, the guide 2 is formed integrally in one of the peripheral walls of the glove-box body 5. The guide 2 has an open end 20, and a close end 21. The open end 20 is disposed at a lower position adjacent to the opening 50 of the glove-box body 5. The close end 21 is disposed at an upper position away from the opening 50. Note that the distance from the close end 21 to the pivotable supporter 10 of the cover body 1 is longer than the distance from the open end 20 to the pivotable supporter 10. Moreover, a first connector 22 and a second connector 23 connect between the open end 20 and the close end 21, respectively. For example, the first connector 22 connects between the close end 21 and the open end 20, and is formed as an arc shape from which the minimum distance between the guide 2 and the pivotably supporter 10 reduces gradually. The second connector 23 connects between the open end 20 and the close end 21, and comprises a leader 25, a presser 26, and a releaser 27. Specifically, the leader 25 is disposed adjacent to the open end 20. The presser 26 is disposed continuously from the leader 25. The releaser 27 is disposed continuously from the presser 26, and is connected with the close end 21. The leader 25 is formed as an arc shape from which the minimum distance between the guide 2 and the pivotably supporter 10 is constant. The presser 26 is formed as an arc shape from which the minimum distance between the guide 2 and the pivotably supporter 10 reduces gradually. The releaser 27 is formed as an arc shape from which the minimum distance between the guide 2 and the pivotably supporter 10 enlarges gradually. Moreover, as best shown in FIG. 2, an inflection point 28 is disposed between the presser 26 and the releaser 27. Note that, from the inflection point 28, the minimum distance between the guide 2 and the pivotably supporter 10 is the shortest of all the other minimum distances.

In the cover according to Example No. 1 of the present invention, the cover body 1 draws a round-arc-shaped locus about the pivotable supporter 10 when the cover body 1 swings in the opening/closing direction designated at the arrow "A" of FIG. 1, because the cover body 1 swings about the pivotable supporter 10.

On the other hand, the extending directions of the guide 2 do not coincide with the direction in which the minimum distance between the guide 2 and the pivotably supporter 10 is constant, except for the extending direction of the leader 25. Therefore, the extending directions of the guide 2 cross the opening/closing direction of the cover body 1 as a whole.

The cover body 1 has a leg 11 which extends to the pivotable supporter 10 in a direction crossing an outer surface of the cover body 1. Moreover, the leg 11 holds the urging member 3 therein.

Figure 4:
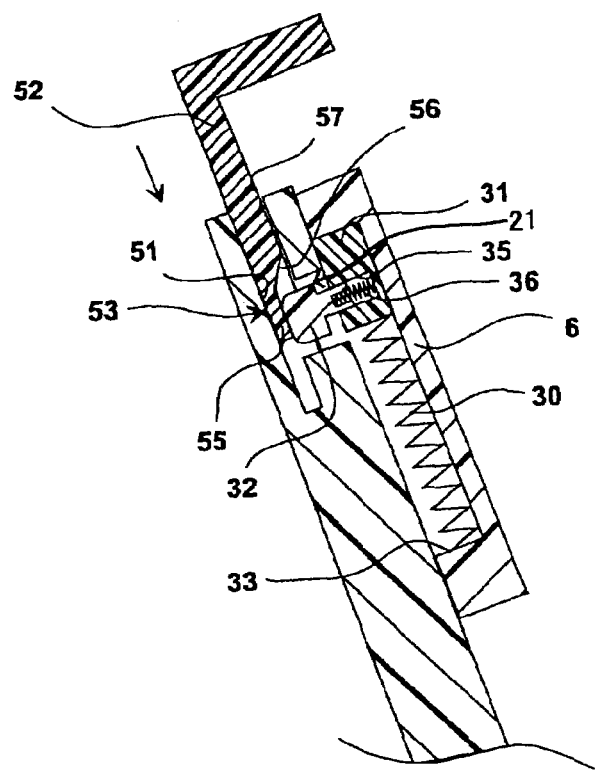
FIG. 4 is an enlarged diagram for schematically illustrating a major part of the cover according to Example No. 1 of the present invention, major part which comprises an urging member, a close end, and an unlocking member.

As best shown in FIG. 4, the urging member 3 has a spring 30, a connector 31, and a pin 32. The spring 30 comprises a coil spring. The connector 31 is installed to one of the opposite ends of the spring 30. The pin 32 is held to the connector 31. Note that the urging member 3 is held inside a regulating member 6 which is formed as hollow. The regulator 6 is formed as a longer box shape, and has an opening in one of the longitudinal surfaces. The inside of the regulator 6 is formed as a longer hollow box shape as well. The connector 31 is formed as a frame shape whose longitudinal length is shorter than that of the regulating member 6, and has an opening in one of the longitudinal surfaces, and an opening in the latitudinal surfaces disposed continuously from the opened longitudinal surface, respectively. The connector 31 of the urging member 3 is held inside the box-shaped hollow of the regulator 6 movably in the longitudinal direction. One of the opposite ends of the spring 30 is fastened inside the frame-shaped connector 31, and the other one of the opposite ends of the spring 30, a fastened end 33 thereof, is exposed outside the frame-shaped connector 31 and is then fastened to the regulator 6. The spring 30 of the urging member 3 is disposed inside the box-shaped hollow of the regulator 6 along with the connector 31 so that the expanding/contracting direction coincides with the longitudinal direction of the box-shaped hollow formed in the regulator 6. Note that the openings of the connector 31 form a cut-off 35. The pin 32 of the urging member 3 is fitted into the cut-off 35. One of the opposite ends of the pin 32 is fitted into and engaged with the grooved guide 2, and is disposed movably in the guide 2. Moreover, a second spring 36 comprising a coil spring is installed to the other one of the opposite ends of the pin 32. The second spring 36 is fastened to the connector 31 at one of the opposite ends, that is, another opposite end with respect to the opposite end installed to the pin 32.

In the cover according to Example No. 1 of the present invention, the regulator 6 is fastened to the cover body 1's leg 11. Moreover, the fastened end 33 of the urging member 3's spring 30 is fastened to the regulator 6. Accordingly, the fastened end 33 of the urging member 3's spring 30 is fastened to the cover body 1 by way of the regulator 6. That is, the urging member 3 is held to the cover body 1 by way of the regulator 6. Note that the urging member 3 is held to the cover body 1 so that the fastened end 33 of the spring 30 is directed toward the pivotably supporter 10 of the cover body 1. Moreover, the urging member 3 is guided by the guide 2 while the pin 32, the opposite end with respect to the fastened end 33 of the urging member 3's spring 30, is engaged with the guide 2. Therefore, in the cover according to Example No. 1, the pin 32 of the urging member 3 makes the engagement end thereof. Note that, in the cover according to Example No. 1, the urging member 3 is disposed inside the box-shaped hollow of the regulator 6 so as to make the expanding/contracting direction coincide the longitudinal direction of the box-shaped hollow formed in the regulator 6. Consequently, the regulator 6 regulates the expanding/contracting direction of the urging member 3 in a sole direction. Moreover, the second spring 36 of the urging member 3 presses the pin 32, the engagement end of the urging member 3, so that the pin 32 is pressed to contact with the inner bottom surface of the grooved groove 2.

The guide 2 comprises the second connector 23 whose groove depth deepens gradually from the open end 20 to the close end 21. Moreover, the close end 21 is formed to have a groove depth which is lower by a step than the neighboring part of the second connector 23. The first connector 22 comprises a step which neighbors the close end 21, and whose groove depth shallows instantaneously from the close end 21 to the open end 20 to be equal to that of the open end 20.

As shown in FIG. 4, a sliding groove 51 is drilled above the close end 21 of the guide 2. The sliding groove 51 opens to the top-wall inner surface of the glove-box body 5. Moreover, the sliding groove 51 is formed to have a groove depth equal to that of the close end 21, and is communicated with the close end 21. In addition, the opposite sides of the sliding groove 51 are closed in the side wall of the glove-box body 5.

A plate-shaped unlocking member 52 is fitted into the sliding groove 51. The unlocking member 52 slides in the sliding groove 51, and has an unlocking end 53 at one of the opposite ends. The unlocking end 53 can go into and come out of the close end 21 of the guide 2. Moreover, the unlocking end 53 comprises a thin-thickness portion 55, an inclined portion 56, and a heavy-thickness portion 57. The thin-thickness portion 55 is disposed at the leading end of the unlocking end 53. The inclined portion 56 continues from the thin-thickness portion 55. The heavy-thickness portion 57 continues from the inclined portion 56. The thickness of the thin-thickness portion 55 is equal to the dimensional difference between the groove depth at the close end 21 and the groove depth at the part of the second connector 23 neighboring the close end 21. The thickness of the heavy-thickness portion 57 is equal to the dimensional difference between the groove depth at the close end 21 and the groove depth at the open end 20. The inclined portion 56 is tapered from narrow to wide in the direction away from the thin-thickness portion 55 so as to connect the thin-thickness portion 55 with the heavy-thickness portion 57 smoothly.

The unlocking member 52 slides between a locking position and an unlocking position. At the locking position, the thin-thickness portion 55 of the unlocking member 52's unlocking end 53 is exposed to the close end 21 of the guide 2, as shown in FIG. 4. At the unlocking position, the thin-thickness portion 55 and inclined portion 56 of the unlocking member 52's unlocking end 53 are exposed to the close end 21 of the guide 2. Moreover, the unlocking member 52 further comprises an operation end (not shown), which continues from the unlocking end 53, at the other one of the opposite end. Specifically, the unlocking member 52 extends from the unlocking end 53 to the operation end beyond the sliding groove 51 so as to expose the operation end to the outside, that is, the vehicle passenger-room side, which faces the opening 50 of the glove-box body 5. Thus, when a user operates the operation end, the locking member 52 moves between the locking position and the unlocking position.

The cover according to Example No. 1 of the present invention operates as hereinafter described.

As shown in FIG. 1, when the cover body 1 is placed at the close position, the pin 32 (i.e., the engagement end) of the urging member 3 is placed at the close end 21 of the guide 2. In this instance, the urging member 3 accumulates an urging force for urging the cover body 1 slightly therein, because the spring 30 of the urging member 3 is compressed slightly.

At the same time, the unlocking end 53 of the unlocking member 52 is placed at the locking position shown in FIG. 4. Accordingly, only the thin-thickness portion 55 of the unlocking end 53 is exposed to the close end 21 of the guide 2. Moreover, not only the pin 32 goes up onto the thin-thickness portion 55 of the unlocking end 53, but also it is pressed against the thin-thickness portion 55 by the urging force of the second spring 36. In this instance, the step between the thin-thickness portion 55 and the first connector 22 locks the pin 32 at the close end 21.

First of all, when moving the cover body 1 from the close position shown in FIG. 1 to the open position shown in FIG. 2, a user operates the operation end of the unlocking member 52 to slide the unlocking end 53 of the unlocking member 52 to the unlocking position. Accordingly, the inclined portion 56 of the unlocking end 53 is exposed to the close end 21 of the guide 2. Consequently, the inclined portion 56 connects the close end 21 with the first connector 22 smoothly.

Here, note that the cover body 1 swings downward about the pivotable supporter 10, which is disposed at the lower end of the cover body 1, by its own weight. Accordingly, when the close end 21 is connected with the first connector 22 smoothly, the force resulting from the cover body 1's own weight to swing the cover body 1 pulls the pin 32 (i.e., the engagement end) of the urging member 3 toward the first connector 22 of the guide 2. Since the urging force of the second spring 36 presses the pin 32 of the urging member 3 against the unlocking end 53 of the unlocking member 52, the pin 32 goes up onto the inclined portion 56 of the unlocking member 52's unlocking end 53 and enters the first connector 22. Consequently, the cover body 1's own weight further pulls the pin 32 of the urging member 3 toward the open end 20 of the guide 2.

The first connector 22 of the guide 2 is formed as an arc shape from which the minimum distance between the first connector 22 and the pivotably supporter 10 reduces gradually from the close end 21 to the open end 20. On the other hand, since the fastened end 33 of the urging member 3 is fastened to the cover body 1, the locus, on which the fastened end 33 moves, draws a round arc about the pivotable supporter 10 of the cover body 1. Accordingly, the minimum distance between the fastened end 33 of the urging member 3 and the first connector 22 of the guide 2 (or the distance between the fastened end 33 and the pin 32 (i.e., the engagement end)) reduces gradually, as the cover body 1 swings from the close position to the open position. In other words, the minimum distance between the locus, on which the fastened end 33 moves, and the first connector 22 (or the distance between the fastened end 33 and the pin 32) reduces gradually in the opening direction of the cover body 1. Therefore, the first connector 22 of the guide 2 presses the pin 32 of the urging member 3 as the cover body 1 swings from the close position to the open position. The spring 30 of the urging member 3 is compressed to accumulate the urging force for urging the cover body 1 in the urging member 3. Note that, in the cover according to Example No. 1, the distance between the close end 21 and the pivotably supporter 10 is longer than the distance between the open end 20 and the pivotably supporter 10. Consequently, the minimum distance between the locus, on which the fastened end 33 moves, and the close end 21 is longer than the minimum distance between the locus, on which the fastened end 33 moves, and the open end 20.

Figure 3:
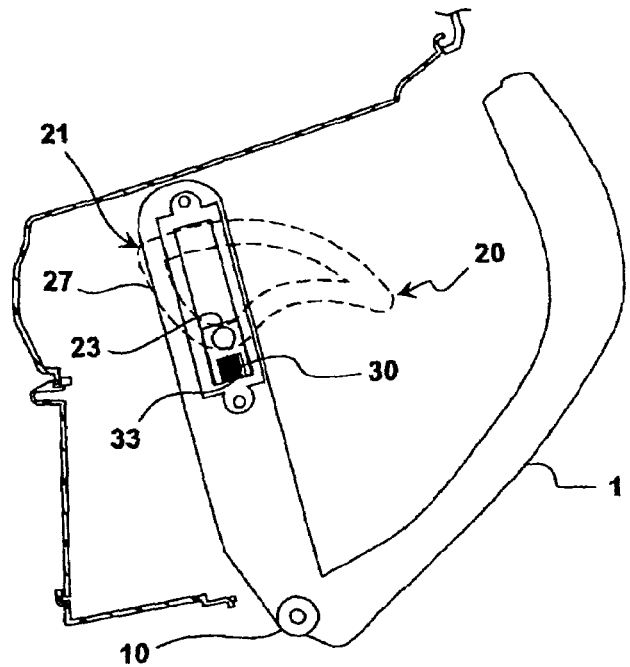
FIG. 3 is still another diagram for schematically illustrating the cover according to Example No. 1 of the present invention.

When moving the cover body 1 from the open position shown in FIG. 2 to the close position shown in FIG. 1, a user first swings the cover body 1 in the closing direction manually. Here, note that the groove depth of the guide 2's second connector 23 deepens gradually from the open end 20 to the close end 21, and that the second spring 36 of the urging member 3 presses the pin 32 (i.e., the engagement end) against the inner bottom surface of the grooved guide 2. Accordingly, the second spring 36 guides the pin 32 from the open end 20 to the second connector 23, and inhibits the pin 32 from moving backward from the open end 20 to the first connector 22. The pin 32, which has moved to the second connector 23, enters the presser 26 by way of the leader 25. Since the presser 26 is formed as an arc shape which produces the minimum distance between the pin 32 (i.e., the engagement end) of the urging member 3 and the locus, on which the fastened end 33 of the urging member 3 moves, that is, the minimum distance between the pin 32 and the pivotably supporter 10 of the cover body 1, shortens gradually, the urging member 3 is furthermore compressed to furthermore accumulate the urging force for urging the cover body 1 therein, when the pin 32 enters the presser 26. The urging member 3 accumulates the urging force until the pin 32 reaches the inflection point 28. Note that the minimum distance between the pin 32 of the urging member 3 and the locus, on which the fastened end 33 of the urging member 3 moves, that is, the minimum distance between the pin 32 and the pivotably supporter 10 of the cover body 1, is the shortest at the inflection point 28, as shown in FIG. 3. Consequently, the guide 2 compresses the spring 30 of the urging member 3 minimally when the pin 32 reaches the inflection point 28.

The pin 32 (i.e., the engagement end) of the urging member 3 enters the releaser 27 of the guide 2's second connector 23 beyond the inflection point 28. Note that the releaser 27 is formed as an arc shape from which the minimum distance between the pin 32 of the urging member 3 and the locus, on which the fastened end 33 of the urging member 3 moves, that is, the minimum distance between the pin 32 and the pivotably supporter 10 of the cover body, lengthens gradually. Accordingly, the urging force accumulated so far moves the pin 32 toward the close end 21. At the same time, the urging member 3 pulls the cover body 1 upward as well so that the cover body 1 moves to the close position shown in FIG. 1. Consequently, the urging member 3 keeps urging the cover body 1 to the close position after the pin 32 goes beyond the inflection point 28 of the guide 2.

In the cover according to Example No. 1 of the present invention, the cover body 1 causes the urging member 3 to accumulate the urging force for urging the cover body 1 when the cover body 1 swings from the close position to the open position and when the cover body 1 swings from the open position to the close position partially, and then the urging force thus accumulated in the urging member 3 urges the cover body 1 to swing from an intermediate position to the close position completely. Accordingly, it is possible not only to carry out a later part of the cover body 1's closing operation automatically, but also to open and close the cover body 1 with ease. Moreover, it is possible for the urging member 3 to accumulate the urging force of large magnitude, because the urging member 3 accumulates the urging force not only during the cover body 1's opening operation but also during an earlier process of the cover body 1's closing operation. Consequently, the thus accumulated urging force can securely close the cover body 1. In addition, it is possible to manufacture the cover according to Example No. 1 inexpensively, because the cover does not require expensive motors at all. Still further, in the cover according to Example No. 1, the cover body 1 operates to open by its own weight, that is, the cover body 1 can open automatically. Thus, it is much easier to operate the cover body 1 to open and close.

In the cover according to Example No. 1 of the present invention, the minimum distance between the pin 32 (i.e., the engagement end) of the urging member 3 and the locus, on which the fastened end 33 of the urging member 3 moves, that is, the minimum distance between the pin 32 and the pivotably supporter 10 of the cover body 1 decreases more as the first connector 22 of the guide 2 approaches the open end 20 from the close end 21, that is, the swing angle of the opening cover body 1 enlarges. On the contrary, the minimum distance is constant in the leader 25 of the guide 2's second connector 23, and increases more as the presser 26 and releaser 27 approach the close end 21 from the open end 20. Accordingly, the cover according to Example No. 1 hardly require excessive forces when a user initiates the cover body 1 to open and close, at which the largest force is required for the user during the opening and closing operations of the cover body 1. Moreover, when a user once starts opening or closing the cover body 1, it is possible for the urging member 3 to accumulate the urging force for urging the cover body 1 with ease, because inertia acts on the cover body 1 to swing. In addition, the largest urging force works on the cover body 1 in the ending process of the cover body 1's closing operation, because the minimum distance increases more as the releaser 27 approaches the close end 21 from the inflection point 28. Consequently, it is possible to swing the cover body 1 to the close position securely.

In the cover according to Example No. 1 of the present invention, note that the urging force of the urging member 3 is small to such an extent that it does not stop swinging the cover body 1 which is actuated by the cover body 1's own weight, but is large enough for urging the cover body 1 to swing until the pin 32 (i.e., the engagement end) of the urging member 3 goes beyond the inflection point 28 of the guide 2 and reaches the close end 21. Therefore, the urging force of the urging member 3 hardly inhibits the swing of the cover body 1 by its own weight, but the urging force accumulated therein can close the cover body 1 reliably.

Further, in the cover according to Example No. 1 of the present invention, the guide 2 is formed integrally with the glove-box body 5. However, the guide 2 can be formed independently of the glove-box body 5, and then can be fastened to and integrated with the glove-box body 5. Furthermore, the urging member 3 comprises a coil spring. However, not limited to coil springs, the urging member 3 can comprise those which are represented by leaf springs, rubbers and elastomers for accumulating the urging force by expansion or contraction. Sill further, the urging member 3 is provided with the regulator 6 for regulating the expansion/contraction direction of the urging member 3's spring 30 in a single direction. However, when the spring 30 is constructed to expand or contract in a sole direction alone, the urging member 3 can be free of the regulator 6.

Moreover, in the cover according to Example No. 1 of the present invention, the urging member 3 accumulates the urging force slightly therein when the cover body 1 is placed at the close position shown in FIG. 1. However, under the circumstances, the urging member 3 can neither expand nor contract so that no urging force is accumulated in the urging member 3.

In addition, the pin 32 of the urging member 3 can be provided with a damper with known construction. If such is the case, the damper inhibits the urging member 3 from urging the cover body 1 to open or close abruptly. Thus, the damper upgrades the opening or closing operation of the cover body 1 in view of dynamic decorativeness, and produces an advantage of opening or closing the cover body 1 more reliably as well.

In the cover according to Example No. 1 of the present invention, the guide 2 comprises two connectors, the first connector 22 and the second connector 23. However, when the weight of the cover body 1 is light, for example, the guide 2 can comprise a single connector whose shape is the same as that of the first connector 22. If such is the case, the pin 32 (i.e., the engagement end) of the urging member 3 moves on the identical connector when the cover body 1 swings to open as well as when the cover body 1 swings to close. Thus, the opening action of the cover body 1 likewise accumulates the urging force for urging the cover body 1 in the urging member 3, and the thus accumulated urging force urges the cover body 1 to close similarly. In this instance, it is advisable to dispose two locking means, one for locking the cover body 1 at the close position and another one for locking the cover body 1 at the open position.

Example No. 2

Figure 5:
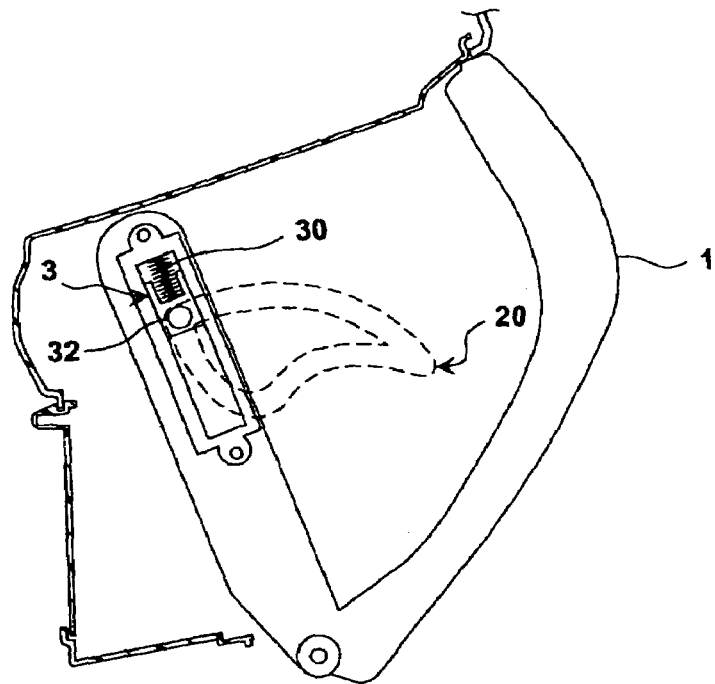
FIG. 5 is a diagram for schematically illustrating a cover according to Example No. 2 of the present invention.
Figure 6:
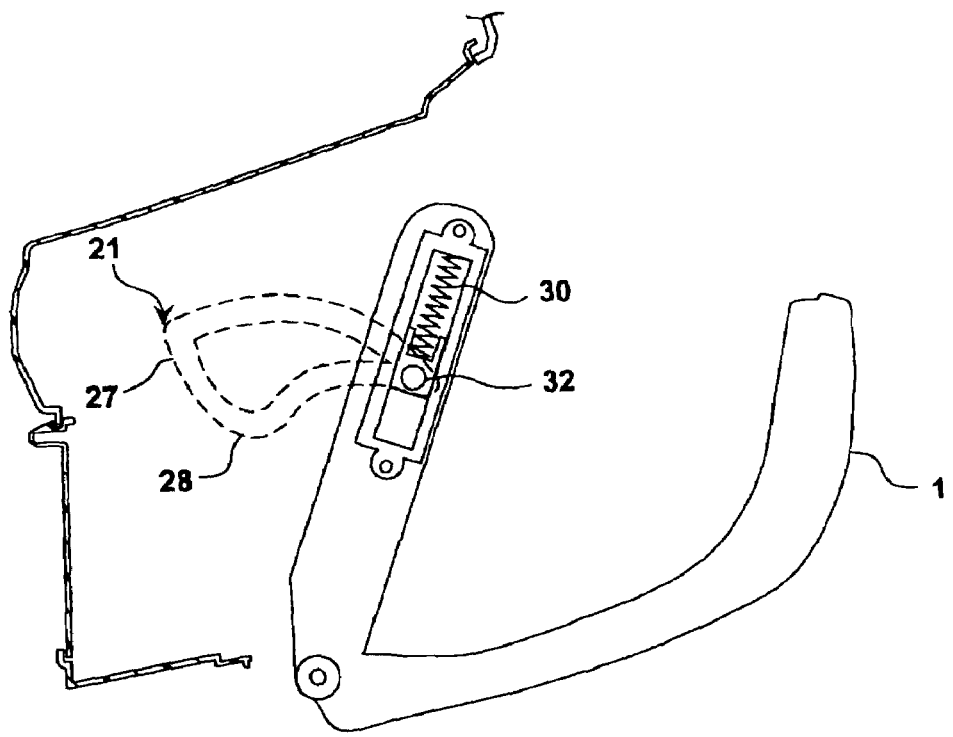
FIG. 6 is another diagram for schematically illustrating the cover according to Example No. 2 of the present invention.
Figure 7:
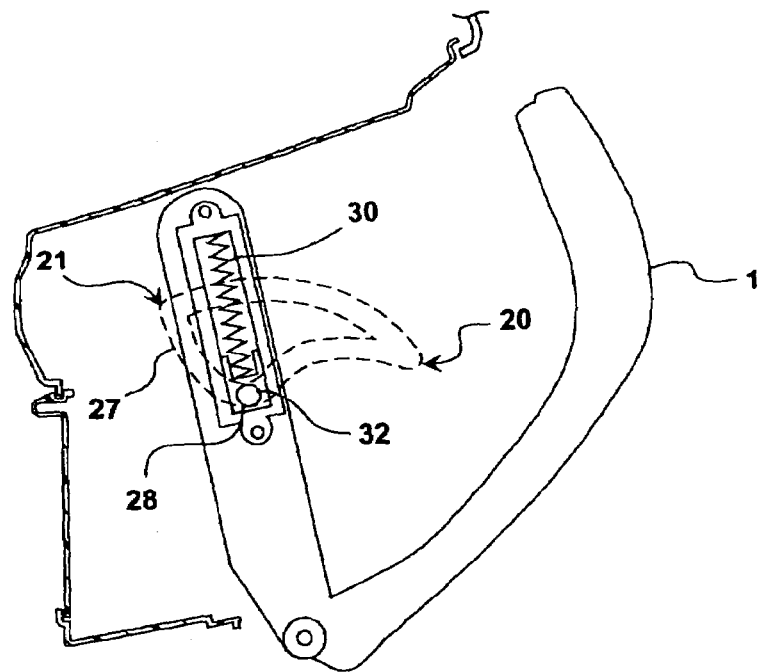
FIG. 7 is still another diagram for schematically illustrating the cover according to Example No. 2 of the present invention.

A cover according to Example No. 2 of the present invention will be hereinafter described. FIGS. 5 through 7 illustrate the cover according to Example No. 2 schematically. Except for the expansion/contraction direction of the urging member 3 and the installation position of the urging member 3 with respect to the cover body 1, the cover according to Example No. 2 is arranged in the same manner as the cover according to Example No. 1.

In the cover according to Example No. 2 of the present invention, the spring 30 of the urging member 3 is neither expanded nor contracted when the pin 32. (i.e., the engagement end) is placed at the close end 21 of the guide 2 as shown in FIG. 5. Then, the spring 30 expands to accumulate the urging force for urging the cover body 1 in the urging member 3 as the pin 32 moves toward the open end 20 as shown in FIG. 6. Moreover, the spring 30 expands maximally when the pin 32 reaches the inflection point 28 as shown in FIG. 7, and accordingly the urging member 3 accumulates the urging force maximally therein. Finally, the urging force accumulated in the urging member 3 moves the pin 32 toward the close end 21 when the pin 32 goes beyond the inflection point 28 to enter the releaser 27. Consequently, the cover body 1, to which the urging member 3 is fastened, is pulled upward by the urging member 3, and is swung to the close position. Therefore, the cover body 1 swings to arrive at the close position automatically between the period after the pin 32 goes beyond the inflection point 28 and until the pin 32 arrives at the close end 21.

In the cover according to Example No. 2 of the present invention, the urging member 3 expands to accumulate the urging force for urging the cover body 1 therein, contrary to the cover according to Example No. 1. However, the cover according to Example No. 2 can demonstrate the same advantages as those produced by the cover according to Example No. 1, because the accumulated urging force urges the cover body 1 to close, similarly to the cover according to Example No. 1.

Example No. 3

Figure 8:
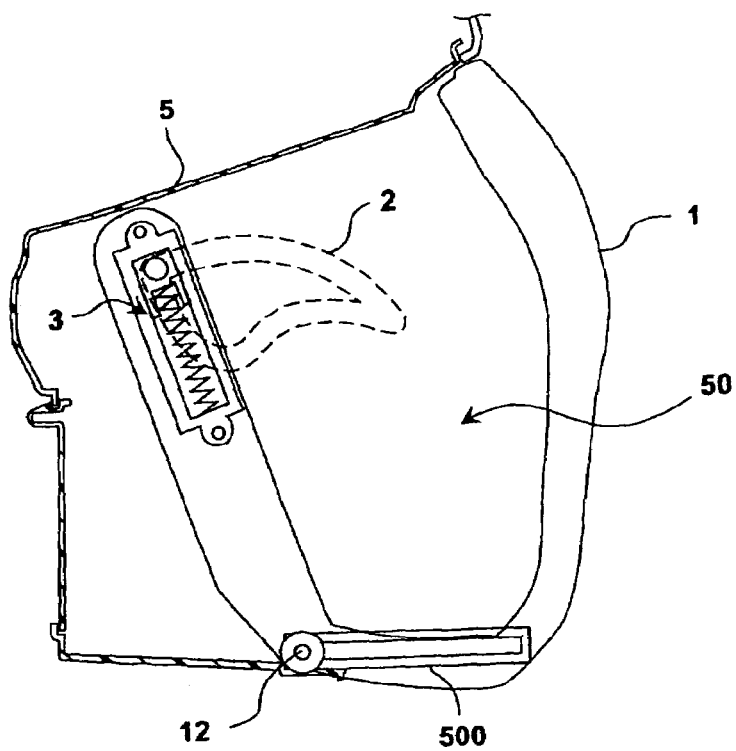
FIG. 8 is a diagram for schematically illustrating a cover according to Example No. 3 of the present invention.
Figure 9:
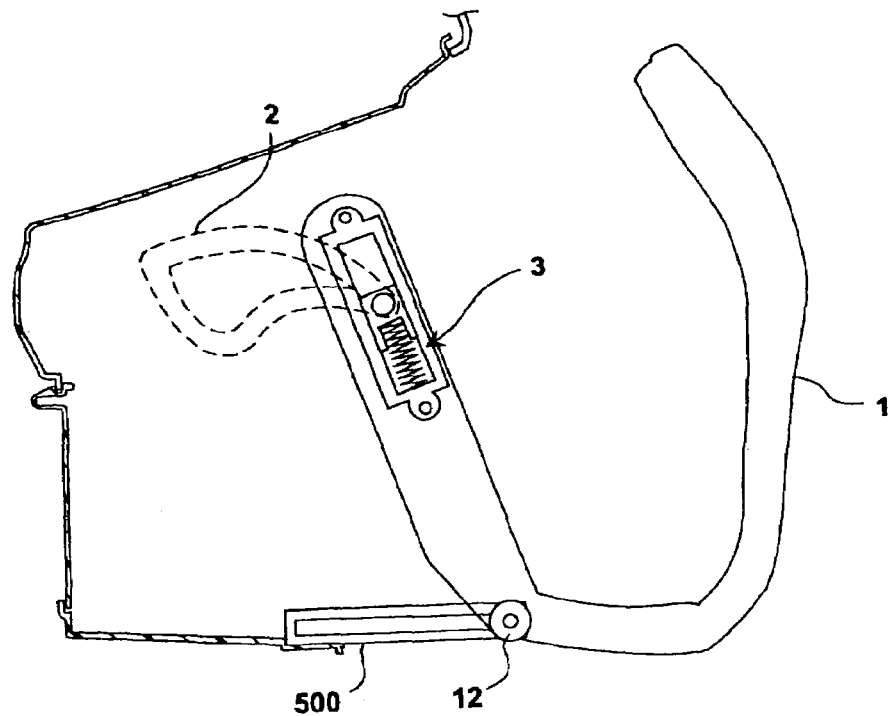
FIG. 9 is another diagram for schematically illustrating the cover according to Example No. 3 of the present invention.

A cover according to Example No. 3 of the present invention will be hereinafter described. FIGS. 8 and 9 illustrate the cover according to Example No. 3 schematically. Except that the cover body 1 slides to open and close of the opening 50 of the glove-box body 5, the cover according to Example No. 3 is arranged in the same manner as the cover according to Example No. 1.

The cover according to Example No. 3 of the present invention comprises a slide rail 500, and a sliding shaft 12 engaging with the slide rail 500. The slide rail 500 is disposed on a lower-end side of the glove-box body 5, and extends from an inner-space side of the glove-box body 5 to the opening 50. The sliding shaft 12 is disposed at the bottom end of the cover body 1. Thus, the cover body 1 slides outward along the disposition direction of the slide rail 500, and moves from the close position, shown in FIG. 8, to the open position, shown in FIG. 9.

In the cover according to Example No. 3 of the present invention, the urging member 3 contracts to accumulate the urging force for urging the cover body 1 therein as the cover body 1 moves in the opening direction, similarly to the cover according to Example No. 1. Therefore, the accumulated urging force urges the cover body 1 to move in the closing direction.

In the cover according to Example No. 3 of the present invention, the urging member 3 contracts to accumulate the urging force for urging the cover body 1 therein, similarly to the cover according to Example No. 1. Accordingly, the cover according to Example No. 3 can demonstrate the same advantages as those produced by the cover according to Example No. 1, because the urging force, which is accumulated in the same manner as the cover according to Example No. 1, urges the cover body 1 to close. Note that, in the cover according to Example No. 3, the urging force, which is accumulated during the opening operation of the cover body 1 as well as during a partial closing operation of the cover body 1, urges the cover body 1 to close. However, when the guide 2 is disposed oppositely, that is, when the guide 2 shown in FIG. 8 is formed as an axisymmetrical shape in the right/left direction in the drawing, it is possible to accumulate the urging force during the closing operation of the cover body 1 as well as during a partial opening operation of the cover body 1, and to urge the cover body 1 so as to complete the remaining opening operation with the thus accumulated urging force.

Example No. 4

Figure 10:
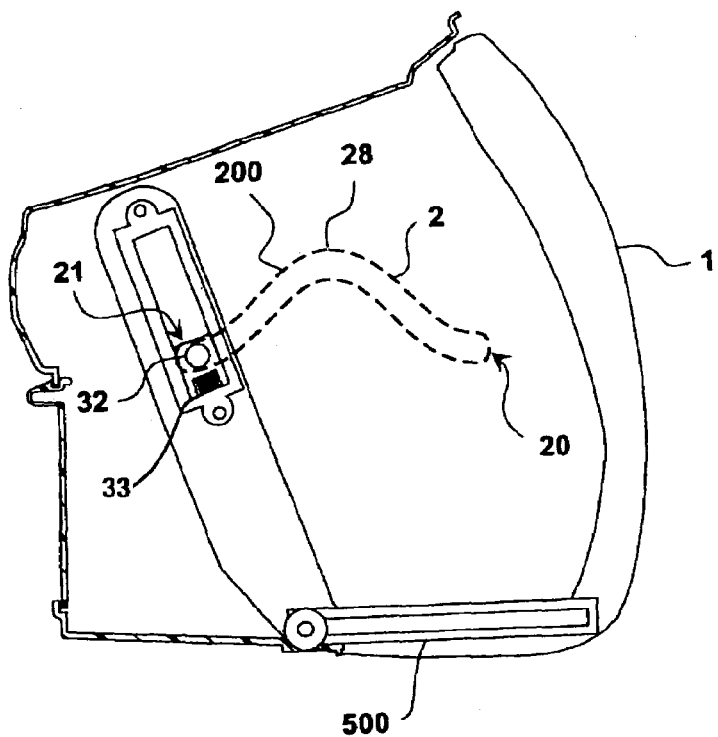
FIG. 10 is a diagram for schematically illustrating a cover according to Example No. 4 of the present invention.
Figure 11:
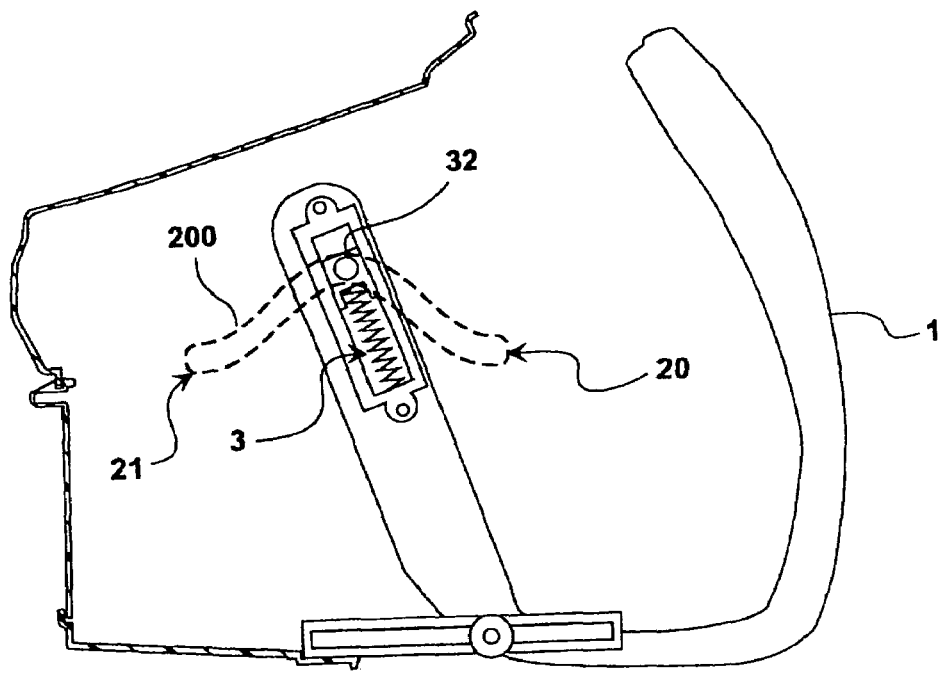
FIG. 11 is another diagram for schematically illustrating the cover according to Example No. 4 of the present invention.
Figure 12:
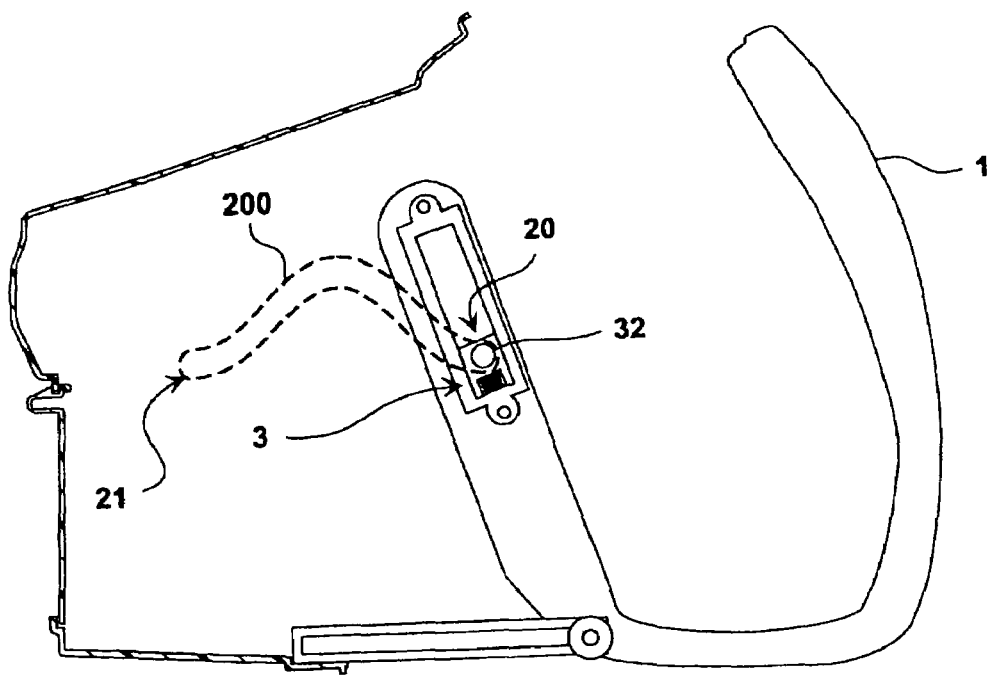
FIG. 12 is still another diagram for schematically illustrating the cover according to Example No. 4 of the present invention.

A cover according to Example No. 4 of the present invention will be hereinafter described. FIGS. 10 through 12 illustrate the cover according to Example No. 4 schematically. Except that the guide 2 is formed differently, the cover according to Example No. 4 is arranged in the same manner as the cover according to Example No. 3.

In the cover according to Example No. 4 of the present invention, the minimum distance between the slide rail 500 and the close end 21 of the guide 2 (that is, the minimum distance between the locus, on which the fastened end 33 of the urging member 3 moves, and the close end 21 equals the minimum distance between the slide rail 500 and the open end 20 of the guide 2 (that is, the minimum distance between the locus, on which the fastened end 33 of the urging member 3 moves, and the open end 20). Moreover, a single connector 200 connects the open end 20 and the close end 21. In addition, an inflection point 28 is disposed in the middle of the connector 200. Note that, at the inflection point 28, the minimum distance between the slide rail 500 and the connector 200 (that is, the minimum distance between the locus, on which the fastened end 33 of the urging member 3 moves, and the pin 32) is the longest. Also note that the urging member 3 is neither expanded nor contracted when the pin 32 is placed at the close end 21 as shown in FIG. 10, and when the pin 32 is placed at the open end 20 as shown in FIG. 12.

In the cover according to Example No. 4 of the present invention, the urging member 3 expands to accumulate the urging force for urging the cover body 1 therein when moving the cover body 1 from the close position, shown in FIG. 10, to the intermediate position, shown in FIG. 11. Note that the urging member 3 is expanded when the pin 32 is placed at the inflection point 28 of the guide 2 as shown in FIG. 11. Moreover, the cover body 1 slides outward automatically by the thus accumulated urging force when moving the cover body 1 from the intermediate position, shown in FIG. 11, to the open position, shown in FIG. 12.

In addition, when moving the cover body 1 from the open position to the close position, the urging member 3 expands to accumulate the urging force for urging the cover body 1 therein from the open end 20 of the guide 2 to the inflection point 28. Therefore, the cover body 1 slides inward automatically by the thus accumulated urging force when moving the cover body 1 from the intermediate position, shown in FIG. 11, to the close position, shown in FIG. 10.

In the cover according to Example No. 4 of the present invention as well, the urging force, which is accumulated in the same manner as the cover according to Example No. 1, urges the cover body 1 to close and open completely. Consequently, the cover according to Example No. 4 can demonstrate the same advantages as those produced by the cover according to Example No. 1.

Having now fully described the present invention, it will be apparent to one of ordinary skill in the art that many changes and modifications can be made thereto without departing from the spirit or scope of the present invention as set forth herein including the appended claims.

What is claimed is:
1. A cover, comprising:
   a cover body for opening and closing an opening, the opening formed in an accommodation housing;
   a guide disposed in the accommodation housing, and extending in a direction crossing a direction, in which the cover body opens and closes the opening, partially at least; and
   an urging member having opposite ends, one of the opposite ends making a fastened end fastened to the cover body so as to hold the urging member to the cover body, the fastened end moving along with the cover body, the other one of the opposite ends making an engagement end engaged with the guide so as to be guided by the guide, the urging member being expandable and contractable for accumulating an urging force as the cover body opens and closes the opening, the urging force urging the cover body in at least one of occasions, when the cover body opens the opening and when the cover body closes the opening, wherein:

the guide comprises a close end, onto which the engagement end of the urging member is placed when the cover body moves to a close position at which the cover body closes the opening, an open end, onto which the engagement end of the urging member is placed when the cover body moves to an open position at which the cover body opens the opening, and a connector connecting the close end and the open end; and one of the close end and the open end has a longer minimum distance to a locus, on which the fastened end of the urging member moves, than that of the other one of the close end and the open end.

2. The cover set forth in claim 1, wherein:

the urging member accumulates the urging force when being contracted;

the connector of the guide comprises a first connector, and a second connector, the first connector connecting the close end and the open end, and guiding the engagement end of the urging member when the cover body moves from the close position to the open position, the second connector connecting the close end and the open end, and guiding the engagement end of the urging member when the cover body moves from the open position to the close position; and one of the first connector and the second connector has an inflection point from which the minimum distance to the locus, on which the fastened end of the urging member moves, is the shortest of all the other minimum distances from the other portions of the guide to the locus.

3. The cover set forth in claim 1, wherein:

the urging member accumulates the urging force when being expanded;

the connector of the guide comprises a first connector, and a second connector, the first connector connecting the close end and the open end, and guiding the engagement end of the urging member when the cover body moves from the close position to the open position, the second connector connecting the close end and the open end, and guiding the engagement end of the urging member when the cover body moves from the open position to the close position; and one of the first connector and the second connector has an inflection point from which the minimum distance to the locus, on which the fastened end of the urging member moves, is the longest of all the other minimum distances from the other portions of the guide to the locus.

4. The cover set forth in claim 1, wherein:

the cover body has a top end, a bottom end, and a pivotable supporter disposed at the bottom end and pivotably supported to the accommodation housing, and swings downward about the pivotable supporter from the open position to the close position, or vice versa, by its own weight; and the urging member accumulates the urging force in magnitude, which hardly halts the cover body swinging downward but can urge the cover body to open or close the opening of the accommodation housing.

5. The cover according to claim 2, wherein:

the one of the first connector and the second connector further has a leader disposed adjacent to the open end, and a releaser disposed adjacent to the close end; and the inflection point is disposed between the leader and the releaser.

6. The cover according to claim 2, wherein:

the one of the first connector and the second connector is formed as a groove which comprises a step neighboring the close end and having a groove depth decreasing instantaneously from deep to shallow in a direction away from the close end to the open end; and the other one of the first connector and the second connector is formed as a groove whose groove depth increases gradually from shallow to deep in a direction away from the open end to the close end.

7. The cover according to claim 3, wherein:

the one of the first connector and the second connector further has a leader disposed adjacent to the open end, and a releaser disposed adjacent to the close end; and the inflection point is disposed between the leader and the releaser.

8. The cover according to claim 3, wherein:

the one of the first connector and the second connector is formed as a groove which comprises a step neighboring the close end and having a groove depth decreasing instantaneously from deep to shallow in a direction away from the close end to the open end; and the other one of the first connector and the second connector is formed as a groove whose groove depth increases gradually from shallow to deep in a direction away from the open end to the close end.

9. The cover according to claim 2, wherein:

the cover body has a top end, a bottom end, and a pivotable supporter disposed at the bottom end and pivotably supported to the accommodation housing, and swings downward about the pivotable supporter from the open position to the close position, or vice versa, by its own weight;

the urging member accumulates the urging force in magnitude, which hardly halts the cover body swinging downward but can urge the cover body to open or close the opening of the accommodation housing; and the first connector is formed as an arc shape from which the minimum distance between the guide and the pivotable supporter reduces gradually.

10. The cover according to claim 3, wherein:

the cover body has a top end, a bottom end, and a pivotable supporter disposed at the bottom end and pivotably supported to the accommodation housing, and swings downward about the pivotable supporter from the open position to the close position, or vice versa, by its own weight;

the urging member accumulates the urging force in magnitude, which hardly halts the cover body swinging downward but can urge the cover body to open or close the opening of the accommodation housing; and the first connector is formed as an arc shape from which the minimum distance between the guide and the pivotable supporter reduces gradually.

11. The cover according to claim 5, wherein:

the cover body has a top end, a bottom end, and a pivotable supporter disposed at the bottom end and pivotably supported to the accommodation housing, and swings downward about the pivotable supporter from the open position to the close position, or vice versa, by its own weight;

the urging member accumulates the urging force in magnitude, which hardly halts the cover body swinging downward but can urge the cover body to open or close the opening of the accommodation housing; and the releaser is formed as an arc shape from which the minimum distance between the guide and the pivotable supporter enlarges gradually.

12. The cover according to claim 7, wherein:

the cover body has a top end, a bottom end, and a pivotable supporter disposed at the bottom end and pivotably supported to the accommodation housing, and swings downward about the pivotable supporter from the open position to the close position, or vice versa, by its own weight;

the urging member accumulates the urging force in magnitude, which hardly halts the cover body swinging downward but can urge the cover body to open or close the opening of the accommodation housing; and the releaser is formed as an arc shape from which the minimum distance between the guide and the pivotable supporter enlarges gradually.

* * * * *